Patented Mar. 25, 1930

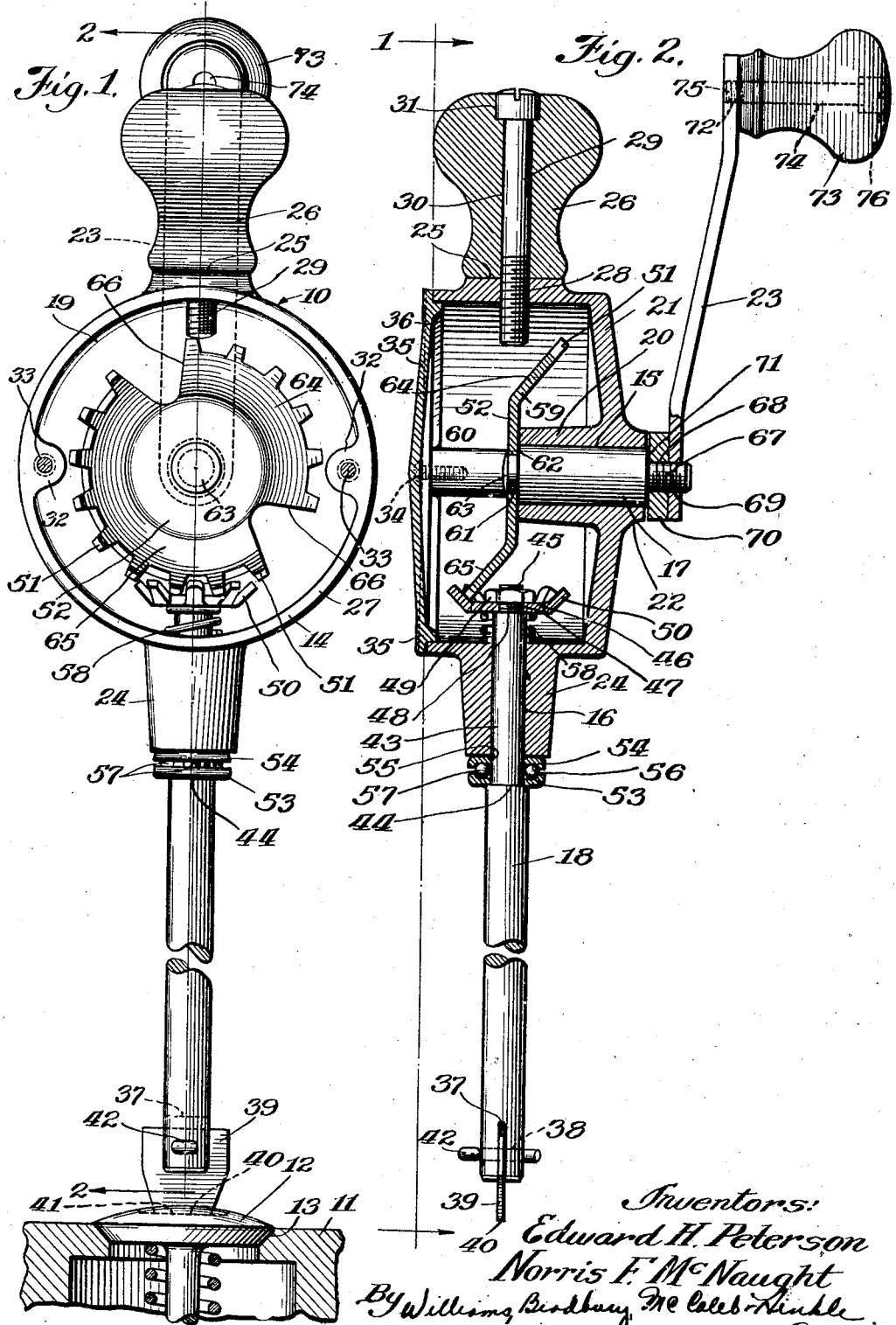

1,751,657

UNITED STATES PATENT OFFICE

EDWARD H. PETERSON AND NORRIS F. McNAUGHT, OF CHICAGO, ILLINOIS, ASSIGNORS TO DURO METAL PRODUCTS COMPANY, OF CHICAGO, ILLINOIS, A CORPORATION OF ILLINOIS

OPERATING MECHANISM FOR VALVE GRINDERS

Application filed May 6, 1929. Serial No. 360,652.

The present invention relates to valve grinders, and is particularly concerned with the provision of an improved form of valve grinder for grinding in the valves of internal combustion engines.

One of the objects of the invention is the provision of a simplified form of valve grinder which is so cheaply manufactured and assembled that it is within the reach of a vast number of potential users of moderate means.

Another object of the invention is the provision of a valve grinder which is adapted to oscillate the valve through angular displacements of different value, so that the valve gradually progresses from its initial position at the end of its oscillations to various other positions, and the entire valve seat is uniformly ground at all points.

Another object of the invention is the provision of a valve grinder having a novel form of actuating gear capable of progressively advancing the valve grinder shaft with an oscillatory motion, which actuating gear may be constructed in the preferred form from a sheet metal stamping.

Other objects and advantages of the invention will be apparent from the following description and from the accompanying drawings, in which similar characters of reference indicate similar parts throughout the several views.

Referring to the single sheet of drawings:

Fig. 1 is an elevational view of the valve grinder with the cover shown in section on the plane of the line 1—1;

Fig. 2 is a vertical sectional view taken on the plane of the line 2—2 of Fig. 1.

Referring to Figs. 1 and 2, 10 indicates the valve grinder in its entirety in connection with the block 11 of an internal combustion engine having a valve 12 adapted to be seated in a valve seat 13. The valve grinder 10 preferably includes a supporting framework which may consist of a casing 14 provided with a pair of transverse bores 15 and 16 adapted to rotatably support shafts 17 and 18. The casing 14 may comprise a substantially cylindrical member which is open at one end 19 and which is formed with an axially located inwardly extending boss 20 having the bore 15. The rear side 21 may also be provided with a similar outwardly extending boss 22 forming a thrust bearing for a crank 23.

The casing 14 is also provided upon its side with a radially projecting integral boss 24 having the bore 16 located transversely relative to the bore 15 and the casing 14 is provided with a flat surface 25 located on the outside of the case diametrically opposite to the boss 24 and adapted to provide a seat for the handle or knob 26. The cylindrical wall 27 of the casing 14 may be provided with a threaded bore 28 centrally located in the circular flat surface 25 for receiving a screw bolt 29.

The handle or knob 26 may be of any convenient form but is preferably provided with a bore 30 adapted to receive the screw bolt 29 and a counterbore 31 adapted to receive the head of bolt 29 and the knob 26 may be secured to casing 14 by threading bolt 29 into bore 28.

The casing 14 may also be provided with a pair of axially extending ribs 32 located at diametrically opposite points upon the inside of the wall 27 to provide sufficient material for forming the threaded bores 33 adapted to receive the screw bolts 34 for securing a cover 35. The cover 35 may comprise a cast metal member of circular form having a diameter substantially equal to the outside diameter of casing 14 and having an inwardly projecting annular flange 36 adapted to be received within the wall 27 of casing 14 when the cover is in the position of Fig. 2.

The shaft 18 may comprise an elongated shaft of steel having a longitudinally extending slot 37 at its lower end and a bore 38 extending transversely to slot 37. The slot 37 is adapted to receive any one of a plurality of valve engaging members 39, the valve engaging member illustrated being a flat piece of sheet metal tapering in width toward its lower edge 40 and adapted to be received in a slot 41 in the valve 12. The valve engaging member 39 is removably secured in slot 37 of shaft 18 by a cotter pin 42.

The upper end of shaft 18 is formed with a cylindrical portion 43 of reduced diameter adapted to be rotatably received in the bore 16, also forming the shaft with an annular shoulder 44. The extreme upper end of the shaft 18 is provided with a reduced threaded portion 45 adapted to support a pinion 46 having a threaded aperture 47 and the pinion may be secured against the annular shoulder 48 by means of a lock nut 49.

The pinion 46 preferably comprises a sheet metal member which may be formed by stamping or otherwise, having a plurality of radially extending teeth 50 which are bent upward out of the plane of the body of pinion 46 at such an angle that the teeth 50 extend transversely to similar teeth 51 formed upon an actuating gear 52.

The shaft 18 may be provided upon its reduced portion 43 with a pair of cupped members 53 and 54, each having a central bore 55 adapted to receive the reduced portion 43 of the shaft 18. The annular flanges 56 of the cupped members 53, 54 are adapted to form a raceway for a plurality of ball bearings 57 when the cupped members 53, 54 are located in opposed relation to each other as shown in Fig. 2.

It will thus be observed that the cupped members 53, 54 and ball bearings 57 provide a thrust bearing for the shaft 18, being confined between the annular shoulder 44 on shaft 18 and the end of the boss 24. The shaft is also preferably provided with a helical spring 58 located about the reduced portion 43 and compressed between pinion 46 and the inside of casing 14 adjacent the bore 16. The spring 58 is adapted to constantly urge the annular shoulder 44 into engagement with the cup 53 and the spring is also adapted to permit sufficient axial movement of the shaft to insure the proper meshing of the gears under all conditions. The spring also permits the shaft 18 to be projected sufficiently from casing 14 to permit the teeth of actuating gear 52 to clear the upper ends of the teeth 50 on the pinion in the assembly of the device.

The actuating gear 52 comprises a stamped sheet metal member having a substantially circular body portion 59 which is provided with a bore 60 adapted to receive a reduced portion 61 of shaft 17. The body portion 59 of the gear 52 may thus be riveted to the shaft 17 between the annular shoulder 62 and the inner end 63 of the shaft.

The actuating gear 52 is also provided with a pair of integral flanges 64 and 65, each formed like a portion of the frustum of a cone and provided with a plurality of teeth 51 carried by the outer edges of the flanges 64, 65. In order that the shaft 18 and consequently the valve 12 may be progressively advanced during its oscillatory movement, the flange 64 is preferably made of less width circumferentially than the flange 65, and the flange 64 is provided with a lesser number of teeth.

The flange 64 is thus provided with six teeth, while the flange 65 is provided with nine teeth, although it should be understood that the exact number of teeth on these members may be varied, provided the proportions of the parts are such as to accomplish the results hereinafter described.

The flanges 64 and 65 may extend at an angle of substantially 45° to the axis of shaft 17 and the teeth 50 of pinion 46 may likewise be bent up at a similar angle so that the teeth 50 on the pinion and the teeth 51 on the actuating gear extend substantially at right angles to each other. The length of the boss 20 and the radial length of the flanges 64, 65 is such that when the parts are assembled as shown in Fig. 2, the body portion 52 of the actuating gear is located substantially in the axis of the shaft 18 and the flanges 64 and 65 are adapted to engage with teeth located upon the opposite sides of the shaft 18.

Intermediate the frusto-conical flanges 64, 65, the actuating gear 52 is provided with substantially V-shaped cut-outs or recesses 66 of sufficient width so that the last tooth 51 upon flange 65 will be disengaged at one side of the pinion 46 before the first adjacent tooth 51 on flange 64 comes into engagement with a pinion tooth 50 on the opposite side of the pinion. The shaft 17 is also provided with a reduced threaded portion 67 adapted to be received in the threaded apertures 68 and 69 of a washer 70 and a crank 23, and the annular shoulder 71 on the shaft 17 is preferably located so that the washer 70 has a slight clearance relative to the boss 22 when the washer 70 is tightly screwed upon shaft 17.

The crank 23 may comprise a strip of sheet metal having a threaded aperture 69 at one end and the threaded aperture 72 at the opposite end, and the handle or knob 73 of crank 23 may be rotatably secured to the crank by providing a screw bolt 74 having a relatively short threaded portion 75 which can be threaded into the crank 23 only a limited amount, so that the head 76 of screw bolt 74 does not bind against knob 73.

The operation of the valve grinder is as follows. The valve seat 13 is provided with a supply of valve grinding compound and the valve grinder is utilized in the familiar manner as shown in Fig. 1. When the crank 23 is rotated by means of knob 73, as for instance, in a clockwise direction, the actuating gear 52 will move counter-clockwise in Fig. 1. The teeth 51 on flange 65 will engage in the teeth 50 of pinion 46 in front of the pinion and the pinion 50 will be rotated counter-clockwise as viewed from above.

This rotation will be continued for approximately one and one-quarter revolutions until the teeth 51 of flange 65 pass out of engagement with teeth 50, after which the teeth 51 of flange 64 will come into engagement with the teeth 50 of pinion 46 at the rear of the pinion in Fig. 1, and the shaft 18 will be rotated approximately three-quarters of a revolution in the opposite direction.

It will thus be observed that the single actuating gear 52 of novel form is adapted to alternately rotate the shaft 18 through unequal angular displacements in oposite directions, thereby giving the shaft 18 a progressively advancing oscillatory motion so that the valve 12 is uniformly ground into its seat over the entire circumference of the valve seat.

It will thus be observed that we have invented a novel and simplified valve grinder including an actuating mechanism which may be conveniently constructed of sheet metal so that the valve grinder of the present construction may be manufactured at a cost which is considerably less than the valve grinders of the prior art. The sheet metal mechanism also requires less machining and other operations to produce a smooth running and satisfactory valve grinder.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a valve grinder, the combination of a supporting casing with a shaft rotatably mounted in said casing, a second shaft rotatably mounted in said casing and having means for engaging the valve, a pinion on said second shaft having peripheral teeth diverging toward the first shaft and inclined at substantially forty-five degrees to the axis of the second shaft, and a centrally located member on the first shaft having gear sectors adapted alternately to engage said pinion to rotate the latter in opposite directions, the teeth of said gear sectors being disposed at right angles to said pinion teeth and engaging with the inner surfaces of the pinion teeth when in mesh therewith.

2. In a valve grinder, the combination of a supporting casing with a shaft rotatably mounted in said casing, a second shaft rotatably mounted in said casing and having means for engaging the valve, a pinion on said second shaft having peripheral teeth diverging toward the first shaft and inclined at substantially forty-five degrees to the axis of the second shaft, a centrally located member on the first shaft having gear sectors adapted alternately to engage said pinion to rotate the latter in opposite directions, the teeth of said gear sectors being disposed at right angles to said pinion teeth and engaging with the inner surfaces of the pinion teeth when in mesh therewith, said second shaft being slidably mounted in said casing, and resilient means for biasing said pinion into engagement with said gear sectors.

3. In a valve grinder, the combination of a supporting casing with a shaft rotatably mounted in said casing, a second shaft rotatably mounted in said casing and having means for engaging the valve, a pinion on said second shaft having peripheral teeth diverging toward the first shaft and inclined at substantially forty-five degrees to the axis of the second shaft, and a centrally located member on the first shaft having gear sectors adapted alternately to engage said pinion to rotate the latter in opposite directions, the teeth of said gear sectors being disposed transversely to said pinion teeth and engaging with the inner surfaces of the pinion teeth when in mesh therewith, and one of said gear sectors having a greater number of teeth than the other gear sector.

4. In a valve grinder, the combination of a supporting frame, with a shaft rotatably mounted in said frame, a second shaft rotatably mounted in said frame and having means for engaging a valve, a pressed sheet metal pinion on said second shaft having peripheral teeth diverging toward the first shaft and inclined to the axis of said second shaft, and a medially located pressed sheet metal driving member on said first shaft, having gear sectors adapted to alternately engage said pinion to rotate the latter in opposite directions, the teeth of said gear sectors being disposed transversely to said pinion teeth and engaging with the inner surfaces of the pinion teeth when in mesh therewith.

In witness whereof, we hereunto subscribe our names this 2nd day of May, 1929.

EDWARD H. PETERSON.
NORRIS F. McNAUGHT.